United States Patent
Peterson

(10) Patent No.: US 10,147,388 B2
(45) Date of Patent: Dec. 4, 2018

(54) SYSTEMS AND METHODS FOR ENHANCING VIEWING EXPERIENCES OF USERS

(71) Applicant: Rovi Guides, Inc., Santa Clara, CA (US)

(72) Inventor: Brian Peterson, Barrington, IL (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/699,882

(22) Filed: Apr. 29, 2015

(65) Prior Publication Data

US 2016/0322018 A1 Nov. 3, 2016

(51) Int. Cl.
- *G09G 3/38* (2006.01)
- *G09G 3/20* (2006.01)
- *G06F 3/147* (2006.01)
- *G09G 3/00* (2006.01)

(52) U.S. Cl.
CPC .............. *G09G 3/38* (2013.01); *G06F 3/147* (2013.01); *G09G 3/003* (2013.01); *G09G 3/2003* (2013.01); *G09G 2320/0626* (2013.01); *G09G 2320/0666* (2013.01); *G09G 2320/08* (2013.01); *G09G 2360/144* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 5,742,264 A * | 4/1998 | Inagaki | G02B 27/017 345/7 |
| 8,046,801 B2 | 10/2011 | Ellis et al. | |
| 8,884,984 B2 | 11/2014 | Flaks et al. | |
| 9,766,459 B2 * | 9/2017 | Alton | G02B 27/0172 |
| 2005/0251827 A1 | 11/2005 | Ellis et al. | |
| 2008/0088936 A1 | 4/2008 | Tang et al. | |
| 2008/0258590 A1 | 10/2008 | Van De Sluis et al. | |
| 2009/0167950 A1 * | 7/2009 | Chen | G06F 3/14 348/602 |
| 2010/0153885 A1 * | 6/2010 | Yates | G06F 3/0482 715/841 |
| 2010/0315379 A1 * | 12/2010 | Allard | G02F 1/133308 345/175 |
| 2011/0074918 A1 * | 3/2011 | Klappert | G06F 3/0346 348/43 |
| 2011/0137727 A1 * | 6/2011 | Chung | G06F 3/0346 705/14.55 |
| 2012/0127284 A1 * | 5/2012 | Bar-Zeev | G02B 27/017 348/53 |
| 2013/0021373 A1 * | 1/2013 | Vaught | G02B 27/017 345/633 |
| 2013/0044129 A1 * | 2/2013 | Latta | G09G 5/00 345/633 |
| 2013/0050255 A1 * | 2/2013 | Sprang | G11B 27/034 345/629 |

(Continued)

*Primary Examiner* — Hilina K Demeter
(74) *Attorney, Agent, or Firm* — Haley Guiliano LLP

(57) ABSTRACT

Methods and systems are described for a media guidance application that enhances the viewing experiences of users by modifying, as perceived by a user, an area outside of the television or computer screen. In particular, the media guidance application may enhance the viewing experiences of users by darkening an area outside of a display screen visible to a user in order to prevent the area outside of the display screen from distracting a user.

18 Claims, 7 Drawing Sheets

(56) References Cited

U.S. PATENT DOCUMENTS

| | | | |
|---|---|---|---|
| 2013/0159856 A1 | 6/2013 | Ferren | |
| 2013/0162698 A1* | 6/2013 | Sasaki | G09G 5/10 345/690 |
| 2013/0194259 A1* | 8/2013 | Bennett | G06T 19/006 345/420 |
| 2013/0335435 A1* | 12/2013 | Ambrus | G06T 19/20 345/589 |
| 2013/0342564 A1* | 12/2013 | Kinnebrew | G09G 3/003 345/619 |
| 2013/0342570 A1* | 12/2013 | Kinnebrew | G09G 3/003 345/633 |
| 2015/0046823 A1* | 2/2015 | Didomenico | G09G 5/14 715/722 |
| 2016/0163063 A1* | 6/2016 | Ashman | G06F 3/011 345/633 |
| 2016/0240125 A1 | 8/2016 | Sridharan et al. | |
| 2017/0287215 A1* | 10/2017 | Lalonde | G06T 19/006 |

* cited by examiner

600

602
Identify a display screen of a first device that is perceivable to a user within a viewing area of a second device

604
Determine a perimeter of the display screen within the viewing area

606
Graphically accentuate, as perceived by the user, a portion of the viewing area within the perimeter relative to a portion of the viewing area outside of the perimeter by modifying a visual characteristic of the area outside the perimeter

FIG. 6

SYSTEMS AND METHODS FOR ENHANCING VIEWING EXPERIENCES OF USERS

BACKGROUND

In conventional systems, a viewing experience of a user is limited to the images displayed within the boundaries of a television or computer screen. Thus, an area outside of the television or computer screen can be found distracting to a user, as it is not pertinent to the images on the screen.

SUMMARY

Accordingly, methods and systems are described herein for a media guidance application that enhances the viewing experiences of users by modifying, as perceived by a user, an area outside of the television or computer screen. In particular, the media guidance application may enhance the viewing experiences of users by darkening an area outside of a display screen visible to a user or may incorporate colors corresponding to the display screen in the area surrounding the display screen in order to prevent the area outside of the display screen from distracting a user. For example, the media guidance application may identify a display screen, such as a television or computer screen, within a viewing area of a second user device (e.g., the lenses of computer glasses). The media guidance application may then determine a perimeter around the display screen within the viewing area of the second device. In order to reduce distractions to the user, the media guidance application may generate for display, in the viewing area of the second user device, a halo of colors to hide a bezel of the display screen or may simply darken the portion of the viewing area outside of the perimeter.

In some aspects, the media guidance application may identify a display screen of a first device that is perceivable to a user within a viewing area of a second device. For example, the second device may be a pair of goggles, glasses or other headgear, comprising a viewing area, such that a user can see his or her environment through the viewing area. The media guidance application may detect and identify a television or computer screen that is visible to the user when said user is looking through a viewing area of the second device.

The media guidance application may determine a perimeter of the display screen within the viewing area of the second device. For example, the media guidance application may identify a border surrounding the television or computer screen that is visible to the user within the viewing area of the second device. In some embodiments, the media guidance application may determine the perimeter of the display screen by identifying vertices of the display screen, correlating the vertices to coordinates of the viewing area, and linearly interpolating points between the coordinates to determine the perimeter of the display screen. For example, the media guidance application may identify four corners of the television or computer screen. The media guidance application may then identify coordinates in the viewing area that correspond to the location of the identified corners. Based on the four coordinates, the media guidance application may interpolate a rectangle between the coordinates. The media guidance application may select the rectangle as the perimeter.

The media guidance application may graphically accentuate, as perceived by the user, a portion of the viewing area within the perimeter relative to a portion of the viewing area outside the perimeter by modifying a visual characteristic of the area outside of the perimeter. For example, the media guidance application may highlight the portion of the viewing area within the perimeter by darkening, as perceived by the user, the portion of the viewing area outside of the perimeter.

In some embodiments, the viewing area of the second device may comprise a suspended particle layer. In such cases, the media guidance application may adjust the voltage across the suspended particle layer of the second device to adjust the light transmittance of the portions of the viewing area outside of the perimeter to graphically accentuate the portion of the viewing area within the perimeter. For example, the second device may comprise a pair of goggles. The glass of the goggles may comprise multiple layers. One of the layers may comprise suspended particles configured to adjust light transmittance. The media guidance application may apply a voltage across the suspended particle layer, so that the light transmittance of that layer may be adjusted. For example, in order to graphically accentuate a portion of the viewing area, the media guidance application may selectively adjust the voltage across the suspended particle layer corresponding to different portions of the viewing area such that the light transmittance of the portion of the viewing area outside of the perimeter is less than the light transmittance of the portion of the viewing area inside of the perimeter.

In some embodiments, the viewing area of the second device may comprise an electrochromic layer. In such cases, the media guidance application may adjust the light transmittance of portions of the viewing area by applying a charge to the electrochromic layer. For example, the second device may be configured as a pair of glasses, in which the lenses may comprise an electrochromic layer. The media guidance application may apply a charge to the electrochromic layer such that the light transmittance of the portion of the layer is changed. For example, the media guidance application may apply a charge to the electrochromic layer corresponding to different portions of the viewing area such that portions of the viewing area inside the perimeter will have a light transmittance value greater than that of the portions of the viewing area outside of the perimeter.

In some embodiments, the media guidance application may darken the portion of the viewing area outside of the perimeter based on ambient lighting values at the second device. For example, the media guidance application may calculate, at the second device, an ambient lighting value of the viewing area using a photoresistor. The media guidance application may cross-reference the ambient lighting value with a look up table of light transmittance values and ambient lighting value pairs to identify a light transmittance value corresponding to the ambient lighting value. For example, the media guidance application may access a database containing ambient lighting value—darkness value (i.e., light transmittance value) pairs. The media guidance application may search the database for a pair with a closest match to the calculated ambient lighting value. The media guidance application may adjust the light transmittance of the portion of the viewing area outside of the perimeter to graphically accentuate the portion of the viewing area within the perimeter based on the identified light transmittance value.

In some embodiments, the media guidance application may further graphically accentuate the portion of the viewing area within the perimeter by modifying a visual characteristic of the portion of the viewing area within the perimeter. For example, the media guidance application may modify a color, brightness, etc., in order to graphically accentuate a portion of the viewing area.

In some aspects, the media guidance application may identify a display screen of a first device that is perceivable to a user within the viewing area of the second device. For example, the media guidance application may use a camera of a second user equipment device to identify objects perceivable to a user from the viewing area of the second device. The media guidance application may use an image processing algorithm to identify a display screen of a first device perceivable to a user within the viewing area of the second device.

In some embodiments the media guidance application may select an area of the display screen. For example, the media guidance application may select an area of the display screen such that the color in the area of the display screen can be used by the media guidance application to generate for display the color in an area outside of the display screen such that the area of the display screen is highlighted.

In some embodiments the media guidance application may determine a color corresponding to the selected area of the display screen. For example, the media guidance application may initiate communication with the first device to query the first device for a color corresponding to the selected area of the display screen. For example, the media guidance application may communicate, over a Wi-Fi network, information about an area in the display screen to the first device. The first device may reply to the media guidance application with data representing a color in the area.

In some embodiments, the media guidance application may select the area based on its proximity to the perimeter. For example, the media guidance application may select an area near an edge of the television or computer screen. Alternatively, the media guidance application may select the entire television or computer screen as the area.

In some embodiments, the media guidance application may then select a color of the television or computer screen that is within the area. For example, the media guidance application may determine the color corresponding to the area of the display screen by calculating the most prominent color in the area. For example, the media guidance application may quantize the colors of an area of a television or computer screen and may then, based on the quantization, select the most prominent color. In another example, the media guidance application may select a color of a pixel from the area. For example, the media guidance application may select a color of a pixel corresponding to an area that is close to the edge of the display screen.

In some embodiments, the media guidance application may determine a perimeter around the display screen within the viewing area. For example, the media guidance application may use a camera of the second device to identify vertices of the display area. For example, the media guidance application may use an image processing algorithm to identify vertices of the display screen. The media guidance application may correlate the vertices to coordinates within the viewing area of the second device. Based on the identified coordinates, the media guidance application may generate a series of points to form a perimeter around the display screen.

The media guidance application may then generate for display, within the viewing area, the color at the perimeter. For example, the media guidance application may generate a color within the viewing area of the second device such that the user perceives the color at the perimeter of the television or computer screen.

In some embodiments, the media guidance application generates for display a plurality of colors at the perimeter, and wherein each of the plurality of colors corresponds to colors in the display screen. For example, the media guidance application may select a color from the television or computer screen for each point at the perimeter. The colors selected by the media guidance application may not all correspond to the same color within the television or computer screen.

In some embodiments, the media guidance application may determine a perimeter where the thickness of the perimeter is greater than one pixel. For example, the media guidance application may generate multiple colored pixels at the perimeter, such that the perimeter is multiple pixels thick. As an example, the media guidance application may determine a perimeter that is the same thickness as a bezel of the first device.

In some embodiments, the color at the perimeter changes in response to color changes in the area of the display screen. For example, the media guidance application may detect color changes in the area of the television or computer screen. When a color change is detected by the media guidance application, the media guidance application may update the color at the perimeter to reflect a new color within the area selected by the media guidance application.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, In which like reference characters refer to like parts throughout, and in which:

FIG. 6 is a flow chart of illustrative steps for graphically accentuating an area around a display screen in accordance with some embodiments of the disclosure;

DETAILED DESCRIPTION OF DRAWINGS

Figure 1:
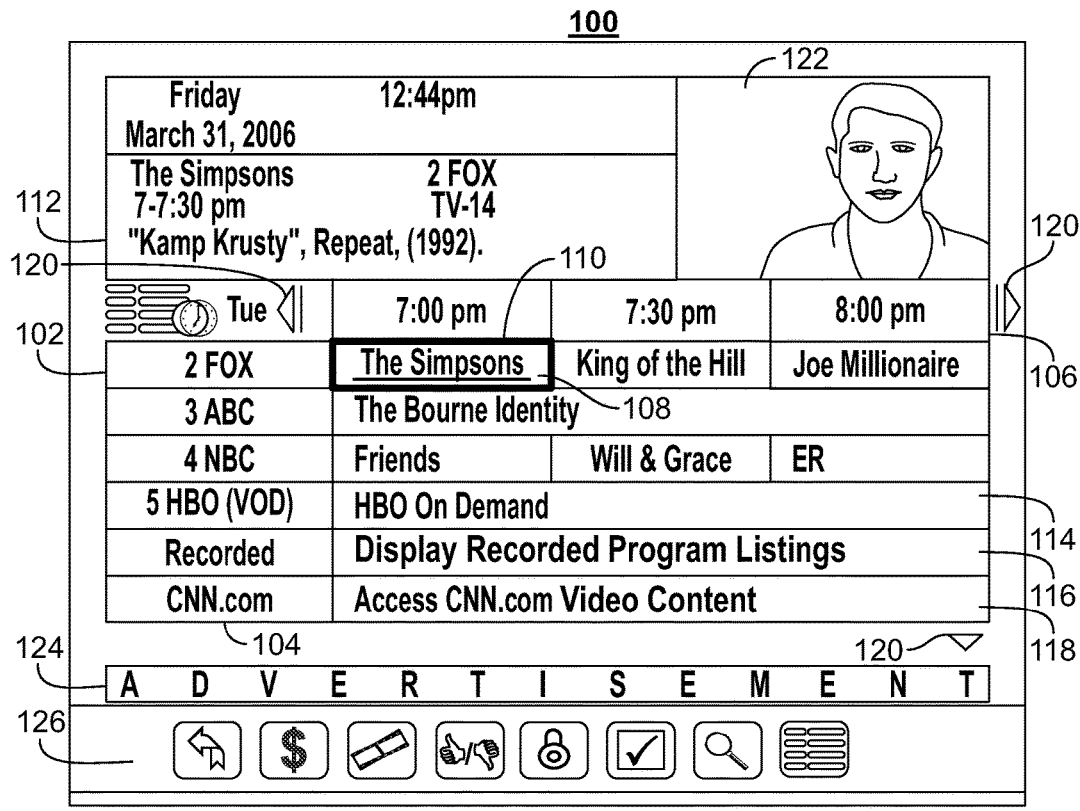
FIG. 1 shows an illustrative example of a media guidance display that may be presented in accordance with some embodiments of the disclosure.

Methods and systems are described herein for a media guidance application that enhances the viewing experiences of users by modifying, as perceived by a user, an area outside of the television or computer screen. In particular, the media guidance application may enhance the viewing experiences of users by darkening an area outside of a display screen visible to a user or may incorporate colors corresponding to the display screen in the area surrounding the display screen in order to prevent the area outside of the display screen from distracting a user. For example, the media guidance application may identify a display screen, such as a television or computer screen, within a viewing area of a second user device (e.g., the lenses of computer glasses). The media guidance application may then determine a perimeter around the display screen within the viewing area of the second device. In order to reduce distractions to the user, the media guidance application may generate for display, in the viewing area of the second user device, a halo of colors to integrate, as perceived by the user, the display screen into the environment perceived by the user, or may simply darken the portion of the viewing area outside of the perimeter to reduce a user's perception of distracting objects.

As referred to herein, a "media guidance application" is an application that enables users to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the media guidance application may interface with a user equipment device. As referred to herein, the phrase "user equipment device," "user equipment," "user device," "electronic device," "electronic equipment," "media equipment device," or "media device" should be understood to mean any device for accessing or viewing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, a headgear or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. In some embodiments, the user equipment device may have sensors configured to measure parameters of a surrounding environment. For example, the user equipment device may contain sensors to measure ambient lighting, proximity to another user equipment device, temperature, ambient noise, etc. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below. In some embodiments, a media guidance application may be able to communicate with a first user equipment device and a second user equipment device via communications hardware of the two user equipment devices. For example, the media guidance application may be able to communicate with the first and second user equipment devices via a Bluetooth, a Wi-Fi connection, an infra datalink, a wired Ethernet connection, etc.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application may identify a display screen of a first device that is perceivable to a user within a viewing area of a second device. As referred to herein, a "display screen" is a component of a device capable of generating colors perceivable by a user. For example, a display screen may be a liquid crystal display, a projection screen, a hologram, etc. As referred to herein, "perceivable to a user" means that something can be sensed by a user. In some embodiments, perceivable to a user means something that can be sensed by a user using the sense of sight. For example, a user standing in front of a display screen wearing a pair of clear glasses can perceive the display screen through the glasses (i.e., the screen is perceivable or visible to a user through the glasses). A display screen is not perceivable by a user wearing an opaque blindfold. As an example, the media guidance application may identify a display screen of a first device such as a television, computer or portable device screen. The second device may be a pair of goggles, glasses or other headwear, comprising a viewing area, such that viewing area is within the field of view of a user and a user can see his or her environment through the viewing area. The second device can modify colors, as perceived by the user, within the viewing area. As referred to herein, a "field of view" of a user is an area that a user can perceive with said user's sense of sight. For example, a field of view of a user comprises objects which he or she can directly see. In contrast, objects that are behind a user are not in a field of view of the user, as the user cannot see the objects. As referred to herein, a "viewing area" is an area of a second user equipment device in which a user may perceive his/her environment and colors generated by the second user equipment device. As referred to herein, an "environment" may be everything that a user can sense around him or her. For example, an environment may be all objects a user is seeing, hearing, touching, smelling and tasting at a given moment. In some embodiments, an environment of a user may comprise the items that a user can perceive with his or her sense of sight. As referred to herein, "headwear" comprises any object that may be worn on the head of the user. For example, headwear may be a hat, helmet, glasses, goggles, etc. In some embodiments, headware may comprise a viewing area, such as a pair of glasses or goggles (e.g., headware), through which a user is able to see an environment (e.g. a lens of the glasses or goggles through which a user can see other objects, or a viewing area). The lens may comprise a layer, such as an LCD layer, configured to augment the colors perceived by the user without permanently obstructing the field of view of the user, such that the user can perceive objects in his/her environment. As referred to herein, "augment" may mean to visually modify light. For example, the media guidance application may augment a color in the field of view of a user by changing the color perceived by a user at the location of the color. For example, the second device may comprise a small projector configured to project images on the lens of the second device, without permanently obstructing the view of the user. The user may wear a pair of goggles (i.e., second device) and may see a television (i.e., first device) in the environment of the user through the glass of the goggles (i.e., viewing area). The media guidance application may instruct the projector to project a color on the lens of the goggles, such that the environment of the user is augmented as the user now perceives the color as a part of his or her environment.

In some embodiments, the media guidance application may use a camera of the second user equipment device to identify the display screen of the first device. The media guidance application may identify light emitting diodes (LEDs) placed near the perimeter of the display screen. For example, a television may contain four light emitting diodes placed on the corners of the display screen. The media guidance application may identify the four LEDs as the corners of the display screen.

In another embodiment, the media guidance application may use image processing to identify the display screen visible with respect to the camera, within the viewing area of the second device. For example, the media guidance application may use an edge detection algorithm to detect edges of the display screen within the viewing area of the second device.

In some embodiments, the media guidance application may calculate the distance and orientation of the second device relative to the display screen of the first device to position the display screen within the viewing area of the second device. For example, the second device may comprise multiple LEDs spaced at a predetermined length. The media guidance application may use a camera of the first device to calculate a separation between the LEDs relative to the first device. Based on the calculated separation and the predetermined spacing, the media guidance application may estimate the distance of the second device. The media guidance application may use the distance of the second device to estimate the size of the display screen within the viewing area of the second device. For example, the media guidance application may query the first device for an actual size (e.g., in inches) of the display screen to calculate the size in the viewing area. The second device may comprise accelerometers or gyroscopes for estimating the orientation of the second device. Based on the calculated distance (e.g., size of the display screen in the viewing area) and orientation, the media guidance application may identify the display screen of the first device perceivable to a user within a viewing area of the second device.

The media guidance application may determine a perimeter of the display screen within the viewing area of the second device. As used herein, the term "perimeter" means a logical boundary defining an area. For example, the media guidance application may define a logical boundary between content that is relevant to a user's media viewing experience and content that is not relevant to a user's media viewing experience. For example, the media guidance application may define a logical boundary between relevant content, such as content displayed on the display screen, and irrelevant content, such as the rest of the environment perceived by the user. The media guidance application may represent this logical boundary by defining a series of points, or pixels, defining the boundary between the two areas. The perimeter may comprise a series of points or pixels, wherein the series is one pixel thick. Alternatively, the perimeter may comprise a series of points, or pixels, wherein the series is multiple pixels thick. For example, the media guidance application may form a perimeter around a display screen of a first device. The perimeter may be five pixels thick, such that the shortest distance between a pixel within the area defined by the perimeter to a pixel outside of both the perimeter and the area defined by the perimeter is five pixels.

In some embodiments, the perimeter may define an area comprising a portion of the display screen of the first device. For example, the media guidance application may define a perimeter around the display screen of the first device. In some embodiments, the perimeter may define an area comprising more objects from the user's environment than the display screen of the first device. For example, the media guidance application may determine a perimeter around an area comprising the display screen of the first device and a bezel of the first device. In some embodiments the media guidance application may determine a perimeter such that the viewing area is divided into two portions: a portion corresponding to the area of the perimeter and a portion corresponding to the area defined by (i.e., inside of) the perimeter. In some embodiments, the media guidance application may determine a perimeter such that the viewing area is divided into three portions: a portion corresponding to the area outside of the perimeter, a portion corresponding to the area of the perimeter and a portion corresponding to the area inside of the perimeter.

The media guidance application may determine the perimeter of the display screen by identifying vertices of the display screen. For example, the media guidance application may use a camera of the second device to identify LEDs corresponding to corners of the display screen of the first device. Alternatively, the media guidance application may use image processing on the images received at the camera to identify corners corresponding to the display screen. In some embodiments, the display screen may contain an infinite number of vertices, such that the display screen appears circular. The media guidance application may determine the perimeter of the display screen by identifying a subset of the vertices less than all of the vertices. However, this is just an exemplary method for identifying vertices of the display screen; one of ordinary skill in the art may recognize other methods for identifying the vertices in accordance with the present application.

In some embodiments, the media guidance application correlates the vertices to coordinates of the viewing area. For example, the media guidance application may correlate the location of the identified vertices within a camera image to coordinates within the viewing area. For example, the media guidance application may access a look up table containing camera image coordinate to viewing area coordinate pairs. Alternatively, the media guidance application may input the camera image coordinates into a mapping function to derive corresponding coordinates within the viewing area.

In some embodiments, the media guidance application may linearly interpolate points between the coordinates to determine the perimeter of the display screen. For example, the media guidance application may identify four corners of a television screen corresponding to coordinates within the viewing area. The media guidance application may interpolate a series of points forming a rectangle between the four coordinates. The media guidance application may select the rectangle as the perimeter. However, this is just an exemplary method for calculating a perimeter. The perimeter may be calculated based on more or fewer than four coordinates. The perimeter identified by the media guidance application may be any shape.

In some embodiments, the media guidance application may determine a perimeter to define an area larger than or smaller than the entire display screen. For example, the media guidance application may identify an area around the display screen comprising the screen bezel. The media guidance application may identify points or vertices corresponding to the edge of the defined area. For example, the media guidance application may use an edge detection algorithm to identify vertices corresponding to the bezel. The media guidance application may correlate the vertices to points in the display area of the second device. The media guidance application may interpolate points between the vertices to form a perimeter.

In some embodiments, the media guidance application may determine the width of the perimeter based on the width of an object perceivable by a user in the viewing area of the second device. For example, the media guidance application may determine the width of the perimeter as the width of a bezel of the first device. For example, the media guidance application may use an edge detection algorithm to determine an outer edge and an inner edge corresponding to the bezel of the first device, wherein the outer edge borders the environment and the inner edge borders the display screen. The media guidance application may correlate the points comprising the edges of the bezel to points in the viewing area of the first device. The media guidance application may calculate a distance (e.g., in pixels) between the inner edge and the outer edge at a point in the bezel. The media guidance application may set a width for the perimeter as the calculated distance between the two edges.

In some embodiments, the width of the perimeter may not be constant. For example, the media guidance application may determine the width of the perimeter as the width of the bezel of the first device, wherein the bezel is not a constant width. The media guidance application may calculate the distance between the inner and outer edges of the bezel at multiple points within the bezel, such that all the calculated distances are not the same.

In some embodiments, the media guidance application may determine a fixed width for the perimeter based on the size of the display screen. For example, the media guidance application may calculate a mathematical area (e.g., measured in pixels) of the display screen of the first device relative to the viewing area of the second device. The media guidance application may multiply the area by a proportion (e.g., a number to scale the area), such that, as an example, the width of the perimeter may be determined to be 2% of the calculated display screen area. In another example, the media guidance application may access a database containing display screen area-perimeter width pairs. The media guidance application may search the database for an area similar to the calculated display screen area to identify a width for the perimeter.

The media guidance application may graphically accentuate, as perceived by the user, a portion of the viewing area within the perimeter relative to a portion of the viewing area outside the perimeter by modifying a visual characteristic of the area outside of the perimeter. As referred to herein, the phrase "graphically accentuate" should be understood to mean making more prominent by modifying a visual characteristic. As referred to herein, a "visual characteristic" is a property of light that a user can perceive through a sense of sight. For example, a visual characteristic may be a brightness, a color or a hue corresponding to a pixel. As an example, the portion of the viewing area within the perimeter may be graphically accentuated by making objects perceived by the user in the portion of the viewing area outside of the perimeter less visible. For example, the media guidance application may darken the portion of the viewing area outside of the perimeter relative to the portion of the viewing area within the perimeter.

In some embodiments, the viewing area of the second device may comprise a suspended particle layer. For example, the second device may comprise a pair of goggles. The glass of the goggles may comprise multiple layers; one layer may comprise suspended particles such that the particles in the layer change their orientation based on a voltage applied, by the media guidance application, across the layer. The orientation of the particles defines a light transmittance for a portion of the viewing area corresponding to the portion of the suspended particle layer. As referred to herein, a "light transmittance" is a value representative of the amount of light that can pass through an object. For example, an object that is perfectly clear (i.e., all light can pass) may have a high light transmittance (e.g., a light transmittance of 100%). As another example, an object that is perfectly opaque may have a low light transmittance (e.g., a light transmittance of 0%). The media guidance application may adjust the voltage across portions of the suspended particle layer of the second device to adjust the light transmittance of the portions of the viewing area. For example, the media guidance application may apply a different voltage across a portion of the suspended particle layer corresponding to a portion of the viewing area outside of the perimeter than across a portion of the suspended particle layer corresponding to a portion of the viewing area within the perimeter. The media guidance application may apply the different voltages so that a portion of the suspended particle layer corresponding to the portion of the viewing area outside of the perimeter has a lower light transmittance than the portion of the viewing area within the perimeter. However, this is just an exemplary method for adjusting the light transmittance of the viewing area of the second device.

In another embodiment, the second device may comprise a pair of glasses. The viewing area of the glasses may comprise multiple layers; one layer may be a liquid crystal layer. The media guidance application may be configured to adjust the voltage across portions of the liquid crystal layer such that a portion of the liquid crystal layer corresponding to a portion of the viewing area outside of the perimeter has a lower light transmittance than a portion of the viewing area within the perimeter.

In some embodiments, the viewing area of the second device may comprise an electrochromic layer. The electrochromic layer may be configured to adjust the light transmittance of the layer based on a charge applied to the layer. The electrochromic layer may comprise ions placed between two electrodes. The media guidance application may apply a charge to an electrode to attract ions to the electrode. The light transmittance of the electrochromic layer changes depending on the electrode to which the ions are attracted. For example, the media guidance application may apply a first charge to a first electrode to increase the light transmittance of the layer and a second charge to a second electrode to decrease the light transmittance of the layer. For example, the second device may be a helmet with an eye shield. The viewing area of the eye shield may be made up of layers, one of which an electrochromic layer. The media guidance application may adjust the light transmittance of a portion of the viewing area by applying a charge to a portion of the electrochromic layer corresponding to the portion of the viewing area. For example, the media guidance application may apply a charge to a portion of the electrochromic layer corresponding to a portion of the viewing area outside the perimeter, such that the portion of the viewing area outside of the perimeter will have a lower light transmittance than the portion of the viewing area inside of the perimeter.

In some embodiments, the media guidance application may darken the portion of the viewing area outside of the perimeter based on ambient lighting values at the second device. The media guidance application may calculate, at the second device, an ambient lighting value of the viewing area. For example, the second device may comprise a photoresistor or an equivalent device whose resistive properties change based on an amount of incident light on the device surface. The media guidance application may apply a voltage across the photoresistor to calculate a resistance value of the photoresistor. The media guidance application may cross-reference the ambient lighting value with a look up table of light transmittance values and ambient lighting value pairs to identify a light transmittance value matching the ambient lighting value. For example, the media guidance application may access a database containing resistance value (i.e., ambient lighting value)-darkness value (i.e., light transmittance value) pairs. The media guidance application may search the database for a pair with a closest match to the calculated resistance value. The media guidance application may adjust the light transmittance of the portion of the viewing area outside of the perimeter to graphically accentuate the portion of the viewing area within the perimeter based on the identified light transmittance value. For example, the media guidance application may use the identified darkness value (i.e., light transmittance value) to apply a specific voltage across a suspended particle layer of the second device to achieve the identified darkness (i.e., light transmittance). However, this is just an exemplary example of how the media guidance application may adjust the light transmittance according to the ambient lighting value. The second device may comprise a diode, wherein the diode is configured to change an output voltage based on an amount of incident light on a surface of the diode. The media guidance application may measure changes in voltage at the diode to calculate an ambient lighting value. In another embodiment, the media guidance application may use a camera of the second device to calculate brightness at the camera. The media guidance application may use the calculated brightness as the ambient lighting value.

In some embodiments, the media guidance application may adjust the light transmittance of a portion of the viewing area based on movement in a user's environment, such that the user will continue to be aware of changes in his or her environment. For example, the media guidance application may track changes in colors corresponding to the portion of the viewing area outside of the perimeter. When a change in color is detected, the media guidance application may increase the light transmittance of the portion of the viewing area corresponding to the changed color. For example, the media guidance application may detect, using a camera of the second device and applying a computer vision algorithm to the pixels received from the camera, a person walking near the display screen. The media guidance application may increase the light transmittance of a portion of the viewing area corresponding to the location of the person. For example, the media guidance application may apply a voltage across a portion of the suspended particle layer such that the person is perceivable to the user through the viewing area of the second device. In some embodiments, the media guidance application increases the light transmittance of the portion of the viewing area corresponding to the person to a high value, such that the light transmittance of the portion of the viewing area corresponding to the person is near 100%. In some embodiments, the media guidance application increases the light transmittance of the portion of the viewing area corresponding to the person based on the light transmittance of the portion of the viewing area outside of the perimeter that does not correspond to the person. For example, the media guidance application may adjust the light transmittance of the portion of the viewing area corresponding to the person such that the light transmittance of said portion is 5% greater than the light transmittance of the portion of the viewing area outside of the perimeter that does not correspond to the person.

In some embodiments, the media guidance application may adjust the light transmittance of a portion of the viewing area based on colors tracked in the user's environment. For example, the media guidance application may track, using the camera of the second device, an object in a user's environment. For example, the media guidance application may identify, using an image processing algorithm, a baby's crib in the environment of the user, corresponding to a portion of the viewing area of the second device. The media guidance application may increase a light transmittance of a portion of the viewing area corresponding to the location of the baby's crib. As the user moves the second device, the media guidance application may track the location of the crib (e.g., using an image processing algorithm) and may increase the light transmittance of the portion of the viewing area corresponding to the location of the baby's crib, such that baby's crib is perceivable to the user through the viewing area of the second device.

In some embodiments, the media guidance application may further graphically accentuate the portion of the viewing area within the perimeter by modifying a visual characteristic of the portion of the viewing area within the perimeter. For example, the media guidance application may further graphically accentuate the portion of the viewing area within the perimeter by adding colors to that portion. The media guidance application may identify a color within the portion of the viewing area within the perimeter. For example, the media guidance application may identify a pixel and the color corresponding to the pixel in the portion of the viewing area. The media guidance application may modify a parameter of the color (such as a brightness, hue, saturation, etc.), to generate a modified color. For example, the media guidance application may adjust a brightness value of the color corresponding to the pixel to generate a modified color. The media guidance application may generate for display, in the viewing area, the modified color. For example, the media guidance application may instruct the second device to display the modified color within the viewing area of the second device, such that the user perceives the modified color at the portion of the viewing area within the perimeter. However, this is just an example for further graphically accentuating the area within the perimeter. In some embodiments, the media guidance application may select a grouping of colors corresponding to an area of the display screen. In another embodiment, the media guidance application may select a color that is not within the portion of the viewing area within the perimeter. The media guidance application may generate the color for display in the portion of the viewing area within the perimeter.

In some embodiments, the media guidance application may identify a display screen of a first device that is perceivable to a user within the viewing area of the second device. For example, the second device may be a pair of goggles. The media guidance application may identify a screen, corresponding to a tablet, within the viewing area of the goggles, using the methods described above. The media guidance application may select an area of the display screen and determine a color corresponding to the selected area of the display screen so the determined color may be generated in a halo around the display screen, as perceived by the user. The media guidance application may generate the color for display in the perimeter to form the halo.

For example, the media guidance application may select a number of pixels corresponding to an area of the display screen. In some embodiments, the media guidance application may identify an area of the display screen so that the color is close in distance (i.e., number of pixels) to a pixel in the perimeter. The media guidance application may select an area of the display screen such that the colors in the area are geographically close to a pixel in the perimeter so that the color generated for display at the perimeter corresponds to the colors close to the edge of the display screen. For example, for a pixel in the top portion of the perimeter, the media guidance application may select an area corresponding to the top portion of the display screen, such that the selected area is close to the pixel.

In some embodiments, the media guidance application may select an area of the display screen so that all colors from the display screen may be selected and generated at the perimeter. For example, the media guidance application may select an area of the display screen comprising the entire display screen of the second device. In some embodiments, the media guidance application may select an area representative of all the colors near the perimeter. For example, the media guidance application may select an area of the display screen adjacent to the perimeter. For example, the media guidance application may select an area bordering the edge of the display screen but not comprising the center of the display screen. The media guidance application may select colors from the area such that all colors in the area are generated for display in the perimeter. In some embodiments, the media guidance application may select a pixel in the display screen whose distance to the edge of the display screen is equal to that of a pixel in the perimeter. For example, the media guidance application may select a pixel that is five pixels away from the edge of the display screen based on the distance of a pixel in the perimeter that is five pixels away from the display screen. This way, the media guidance application may generate for display a repetition of the colors from the display screen in the halo. In some embodiments, the media guidance application selects a size of the area of the display screen based on the width of the perimeter. For example, the media guidance application may select an area of the display screen equal in size to the width of the perimeter.

In some embodiments, the media guidance application may then select a color corresponding to the area. The media guidance application may select the color corresponding to the area so that the media guidance application may generate the color for display in a halo perceived by the user around the display screen. The media guidance application may generate the color for display in a halo to expand the display screen colors perceived by the user, and integrate the display screen into the viewing environment perceived by the user. The media guidance application may determine a perimeter representative of a portion of the viewing area that will comprise the halo. For example, the perimeter may be selected as the area surrounding the display screen comprising the screen bezel. The media guidance application may select a color corresponding to the display screen such that the color generated for display at the perimeter will blend in the bezel into the environment of the user. The media guidance application may blend the bezel into the environment of the user so that the user may no longer be distracted by the abrupt end of the display screen at the bezel and instead provide a smooth color transition to the environment surrounding the display screen. For example, the second device may comprise a camera capable of interpreting colors of the area of the display screen. The media guidance application may use the camera to select a color within an area of a screen corresponding to a tablet. In an example, the media guidance application may communicate with the first device to select a color corresponding to an area of the display screen. For example, the media guidance application may request, from the first device over Bluetooth, a binary value representing a color within the area of the display screen. The media guidance application may send to the first device coordinates of the area and the first device may return the color values to an input device of the media guidance application.

In some embodiments, the media guidance application may determine the color corresponding to the area by calculating the most prominent color in the area. For example, the media guidance application may use a camera of the second device to quantize the colors of the area of the display screen. The media guidance application may use a few, discrete, quantized values to determine a most prominent color of the area of the display screen. The most prominent color of the area of the display screen may not be a color present on the display screen, but instead may be an estimation, by the media guidance application, of a true most prominent color. In an example, the media guidance application may communicate with the first device to determine a most prominent color in the area of the display screen. For example, the media guidance application may request CMY representations of colors corresponding to the area of the display screen from the first device over Wi-Fi. The media guidance application may then calculate the most prominent color based on the most frequently received CMY value. The most prominent color may be generated for display at a perimeter of the display screen to provide a halo around the display screen that is not distracting to a user. For example, the display screen may show a dark scene. A user may be distracted by a bright bezel surrounding the display screen of the first device. The media guidance application may determine a perimeter comprising the bezel. Based on the most prominent color of the image, the media guidance application may generate a halo of the most prominent color (i.e., a dark color) at the perimeter (e.g., to cover the bezel) of the display screen.

In some embodiments, the media guidance application may determine a perimeter around the display screen within the viewing area of the second device as described above. For example, the media guidance application may identify edges of a television screen and may interpolate points between the identified edges of the television screen. In some embodiments the perimeter may be multiple pixels wide. The media guidance application may select a perimeter such that the media guidance application may generate colors for display at the perimeter of the display screen to integrate the display screen into the environment of a user. For example, the media guidance application may select a perimeter to be the bezel of the display screen, such that when the media guidance application generates colors for display at the bezel, the user will no longer be distracted by said bezel.

In some embodiments, the media guidance application may generate for display within the viewing area a color at the perimeter. The media guidance application may generate the colors for display at the perimeter to reduce the distracting effects of an object in the user's environment. For example, the media guidance application may identify a color corresponding to an area of a telephone display. The media guidance application may then generate for display the color at the perimeter. For example, the media guidance application may instruct the second device to project the identified color at a pixel corresponding to the perimeter. In another example, the media guidance application may generate for display a color at a pixel, corresponding to the perimeter, in an LCD display of the second device. In some embodiments, the media guidance application instructs the second device to display a single color around the perimeter of the display screen (e.g., to embody the color of an image displayed on the display screen). In some embodiments, the media guidance application may display a plurality of colors at the perimeter of the second device (e.g., to generate a halo of colors representative of the colors near the perimeter). As an example, the media guidance application may select a different color for every point on the perimeter of the display screen. For example, the media guidance application may select multiple areas of the display screen for each point of the perimeter. For each selected area of the display screen, the media guidance application may select a color and may generate the color for display at the perimeter. This is just an exemplary embodiment; there may be any number of colors generated for display at the perimeter.

In some embodiments, the media guidance application may generate a color for display at the perimeter of the display screen corresponding to an area of the display screen. As a color in the area changes, the media guidance application may update the color at the perimeter of the display screen. For example, the media guidance application may identify a color in an area of a computer display screen displaying a movie. As time passes, the display screen may display differently colored frames. The media guidance application may detect changes in the colors of the frames. For example, the media guidance application may store values of the colors at selected points of the display screen (e.g., points corresponding to the areas or randomly selected points). At a predetermined interval, the media guidance application will check the colors at the points to see if the color has changed. In response to detecting a change in a color, the media guidance application may select a new color from an area of the display screen. The media guidance application may select the new color such that the new color corresponds the pixel utilized by the media guidance application for selection of the old color. The new color may be generated for display by the second device at the perimeter of the display screen.

In some embodiments, the perimeter of the display screen may be greater than one pixel. For example, the media guidance application may identify a tablet display screen within the viewing area of the second device. The media guidance application may identify an area corresponding to a bezel of the tablet. For example, the media guidance application may identify vertices of the bezel of the tablet. The media guidance application may determine an edge of the bezel by interpolating points between the vertices of the bezel. The media guidance application may then make the thickness of the perimeter equal to the distance between the perimeter of the display and the edge of the bezel. However, this is just an exemplary example of how to calculate the thickness of the perimeter. The media guidance application may simply calculate the thickness of the perimeter as a fixed value.

In some embodiments, the media guidance application may replace images displayed on the display screen so that a first user and a second user perceive different images in the viewing area corresponding to the display screen. For example, a television may display a soda advertisement in a display screen of the television. The media guidance application may instruct a first user device corresponding to a first user to display a Pepsi can in the viewing area of the first user device, while the media guidance application may instruct a second user device corresponding to a second user to display a Coke can in the viewing area of the second user device.

In some embodiments, the media guidance application may display text in the viewing area of the second device. For example, the media guidance application may instruct the second device to generate for display closed captions in the viewing area. In another example, the media guidance application may translate audio from the television into another language. The media guidance application may generate for display, in the viewing area of the second device, the translated text. In another example, the media guidance application may instruct a second device corresponding to a first user to display a first set of text in a viewing area of the device. The media guidance application may instruct a second device corresponding to a second user to display a second set of text in a viewing area of the device. In another example, the media guidance application may generate text for display in the viewing area of the second device while a display screen is not perceivable by a user.

In some embodiments, the media guidance application may display content relevant to an inferred state of the user. For example, the media guidance application may monitor biometric factors of a user to determine a state of the user. The media guidance application may determine that a user is not interested in a program displayed on the display screen by taking biometric readings from the user. The media guidance application may generate for display, within the viewing area of the second device, media recommendations for the user. In another example, the media guidance application may monitor the eye movement of a user when an advertisement is displayed on the display screen. The media guidance application may determine that the user is interested in the advertisement based on the eye movement patterns of the user. The media guidance application may store data indicating that specifics of the advertisement should later be generated for display to the user.

In some embodiments, the media guidance application may be integrated with a secondary information source containing information and metadata about media assets. For example, the media guidance application may be integrated with a movie database. The media guidance application may retrieve information from the movie database in response to detecting that a user is watching a movie. The media guidance application may generate for display in the viewing area of the second device information about the movie.

In some embodiments, the media guidance application may generate for display in the viewing area of the second device scene level information about a media asset displayed on the display screen without obscuring the display screen. For example, a media guidance data source may integrate with a secondary data source to retrieve information about a media asset displayed on a display screen. The media guidance application may detect when a user tilts his or her head slightly away from the display screen. The media guidance application may subsequently instruct the second device to display information related to the scene in the display area of the second device.

In some embodiments, the media guidance application may enable a user to copy, as perceived by a user, an image displayed on the display screen to another position in his or her environment. For example, the media guidance application may detect an advertisement on the display screen. The media guidance application may detect a gesture by a user to drag an item from the display screen to the environment of the user. In response to detecting the gesture, the media guidance application may generate for display in the viewing area of the second device an image from the advertisement.

In some embodiments, the media guidance application may detect a gesture from a user to save an item from the advertisement. For example, the media guidance application may detect a coupon on the display screen. The media guidance application may detect a drag gesture from the user to initiate a save of the coupon in memory. In response to detecting the gesture, the media guidance application may store the coupon in memory.

In some embodiments, the media guidance application may automatically detect and store information about advertisements displayed on the display screen so that the media guidance application can automatically instruct the second device to play back the advertisement in the viewing area of the second device without user input. For example, the media guidance application may detect a Cheerios advertisement on the display screen. At a later time, the media guidance application may detect a box of Cheerios in the viewing area of the second device and may instruct the second device to display the Cheerios advertisement.

In some embodiments, the media guidance application may recognize text displayed on a display screen to determine whether the text describes content not yet seen by the user. For example, the media guidance application may perform optical character recognition (OCR) on text displayed on a display screen to determine if the text is about a media asset. If so, the media guidance application may access a list of media assets viewed by a user. If the media asset has not been viewed by the user, the media guidance application may instruct the second device to blur, as perceived by the user, the text containing information about the media asset.

In some embodiments, the media guidance application may replace portions of the viewing area with a custom overlay. For example, the media guidance application may detect a wooden basketball court in a basketball game displayed on the display screen. The media guidance application may generate for display in the viewing area of the second device colors in the area corresponding to the court, such that the user perceives a different court.

In some embodiments, the media guidance application may integrate with a fantasy sports roster of a user to highlight, as perceived by the user, players displayed on the display screen corresponding to players in the fantasy sports roster of the user. For example, the media guidance application may detect Marshawn Lynch in a fantasy sports roster of a user. When the media guidance application detects Marshawn Lynch on the display screen, the media guidance application may instruct the second device to display a halo of colors, as perceived by the user, around Marshawn Lynch, such that he is highlighted.

In some embodiments, the media guidance application may extend, as perceived by the user, the display screen by generating for display, at the viewing area of the second device, colors in the portion of the viewing area that does not correspond to the display screen. For example, the media guidance application may generate for display 3D effects in the portion of the viewing area corresponding to an area outside of the display screen.

In some embodiments, the media guidance application may receive a second layer of video information corresponding to a media asset displayed on the display screen. The media guidance application may generate for display in the viewing area of the second device the second layer of video. For example, the media guidance application may receive a second layer of video corresponding to a space movie. The media guidance application may display asteroids, from the second layer of video, in the portion of the viewing area of the second device corresponding to an area outside of the display screen.

In some embodiments, the media guidance application may generate for display guidance information outside of the portion of the viewing area corresponding to the display screen. For example, the media guidance application may determine a size and a position of the display screen perceivable to a user through the viewing area of the second device. The media guidance application may display an interactive program guide outside of the portion of the viewing area corresponding to the display screen.

In some embodiments, the media guidance application may track a position of the display screen as the user changes a position of the second device. For example, after detecting the display screen in the viewing area of the second device, the media guidance application may use an accelerometer or a gyroscope to track movement of the second device. Based on the movement data, the media guidance application may calculate a new location of the display screen in the viewing area of the second device relative to the new position of the second device.

Figure 2:
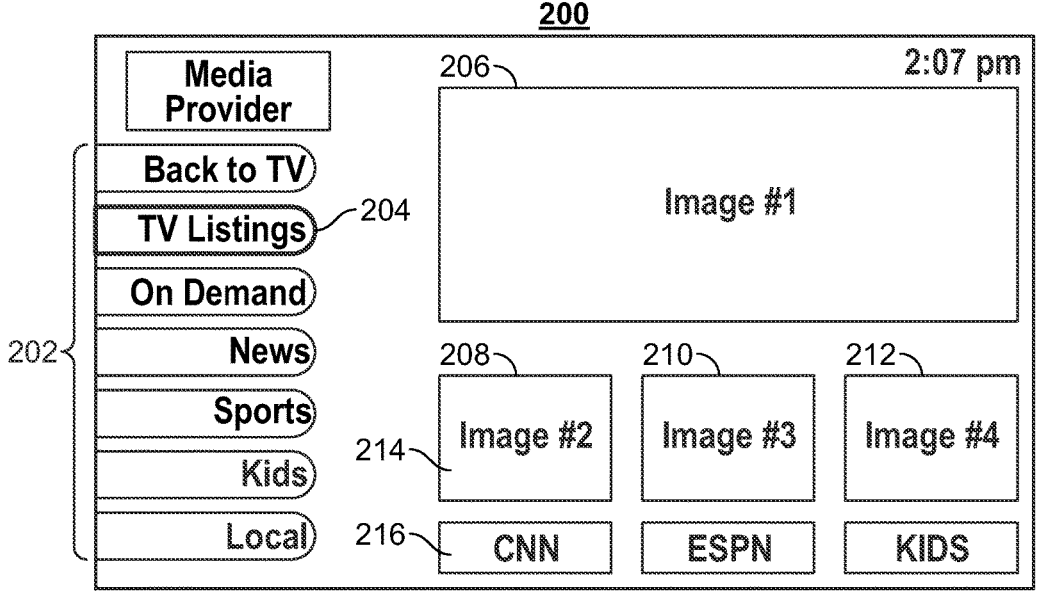
FIG. 2 shows another illustrative example of a media guidance display that may be presented in accordance with some embodiments of the disclosure.

In some embodiments, the media guidance application may receive a request from a user to graphically accentuate a portion of the viewing area of a second device. The media guidance application may receive the request through one or more of the display screens, such as those shown in FIGS. 1-2. FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access his or her personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
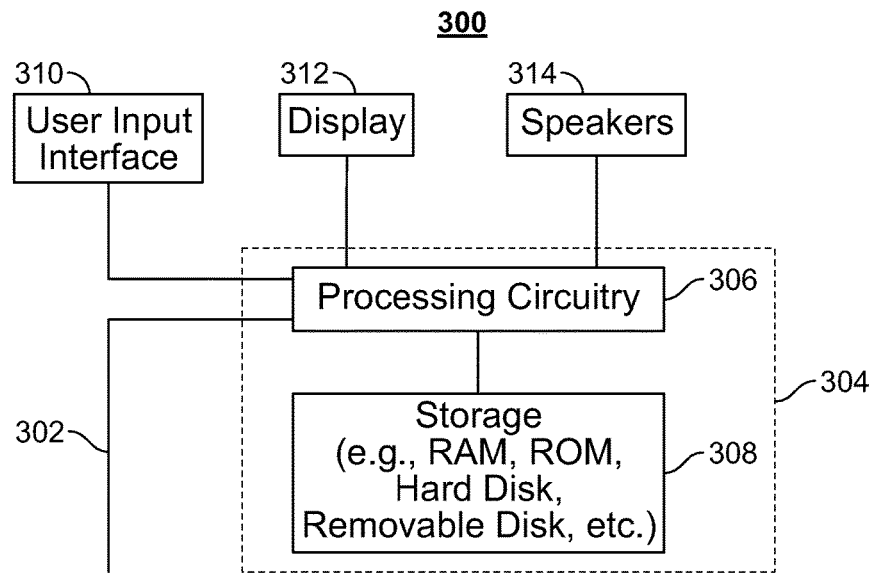
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
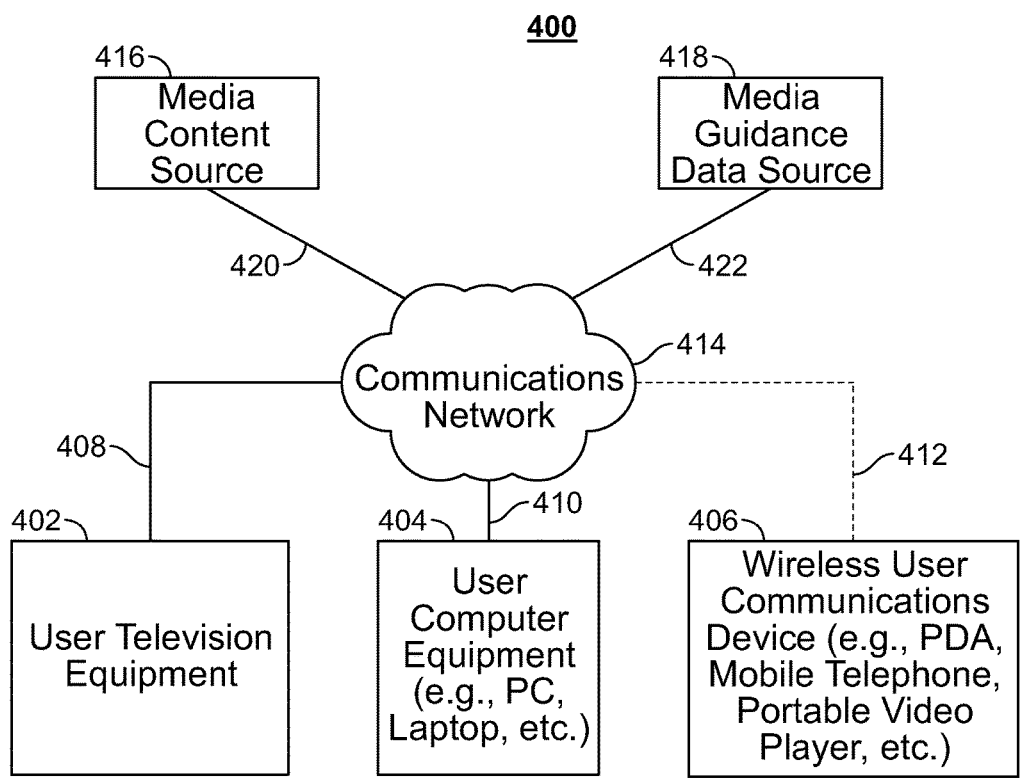
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on his or her personal computer at his or her office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
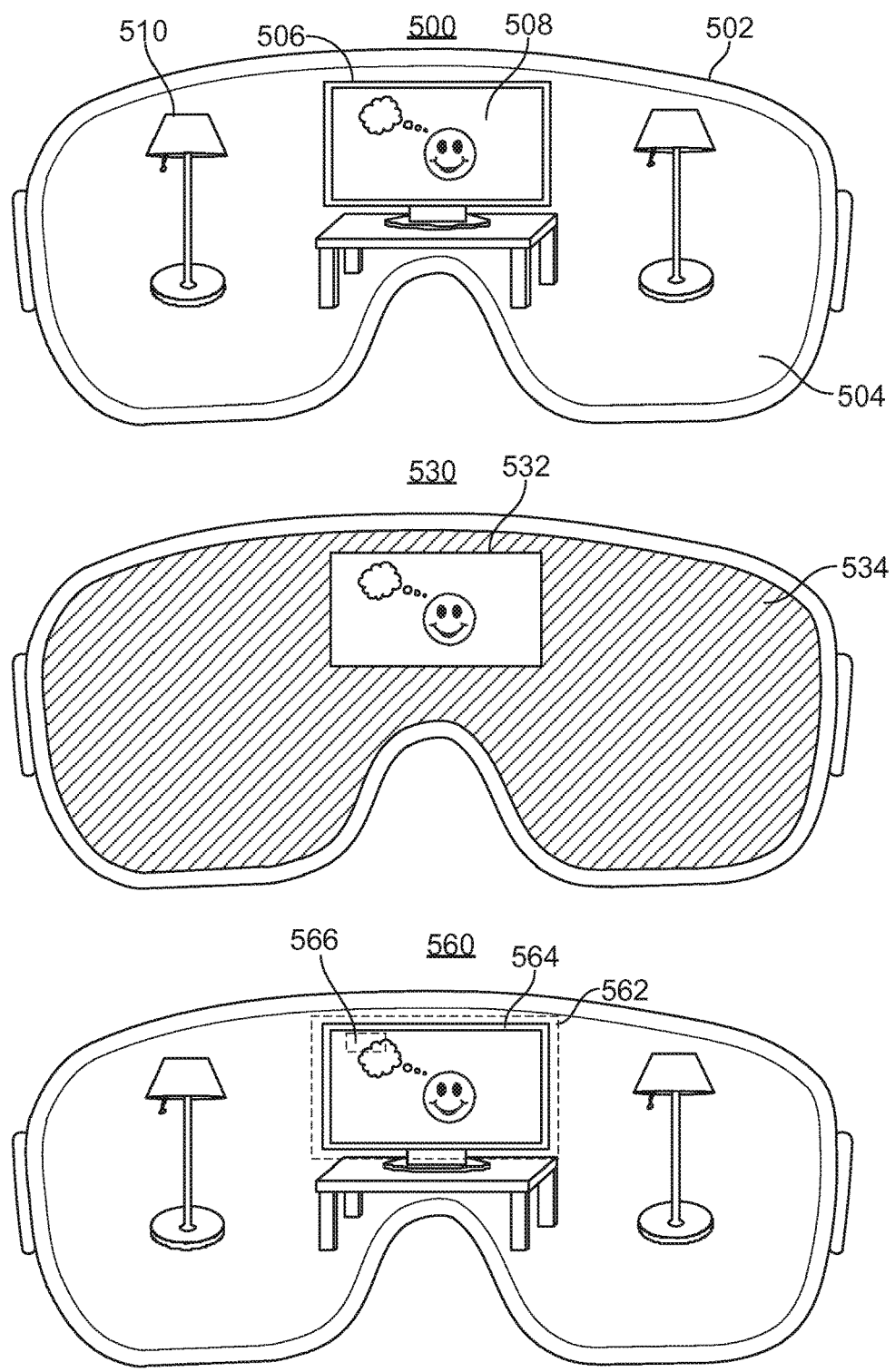
FIG. 5 shows an illustrative example of a user equipment device enhancing a viewing area of the user equipment device in accordance with some embodiments of the disclosure.

FIG. 5 illustrates an example of a media guidance application enhancing the viewing experience of a user. Element 500 illustrates a viewing experience before the media guidance application provides any enhancements. A second user equipment device 502 may be a pair of goggles comprising a viewing area 504. Second user equipment device 502 may be implemented on user television equipment 402, user computer equipment 404 and/or wireless user communications device 406. Viewing area 504 may comprise glass, plastic, etc., and may further comprise multiple layers. Layers of viewing area 504 may include an LCD display layer, an electrochromic layer, a suspended particle layer, a projection rendering layer etc. Viewing area 504 may comprise display 312 for displaying colors within viewing area 504. Viewing area 504 may allow a user to view elements of his or her environment, such as a first user equipment device, television 506 or lamp 510. Television 506 may comprise a display screen 508 which may display colors and images such as a smiley face. The media guidance application may detect (e.g., via control circuitry 304) display screen 508 within viewing area 504 of second user equipment device 502.

530 illustrates an enhanced viewing experience of a user. The media guidance application may determine a perimeter 532, using control circuitry 304, of display screen 508 within the viewing area 504 of second user equipment device 502. The media guidance application may instruct, via control circuitry 304, the second device to darken portion 534 of viewing area 504 outside of perimeter 532. The media guidance application may adjust parameters of a layer of viewing area 504 to darken portion 534 of viewing area 504 outside of perimeter 532. For example, the media guidance application may adjust the voltage across a portion in a suspended particle layer corresponding to portion 534 of viewing area 504 outside of perimeter 532 to darken portion 534.

560 illustrates another embodiment of an enhanced viewing experience of a user. The media guidance application may generate for display (e.g., using control circuitry 304) halo 562 around display screen 508 within viewing area 504 of second user equipment device 502. The media guidance application may generate for display (e.g., using control circuitry 304) halo 562 larger than television bezel 564. Alternatively, the media guidance application may generate for display (e.g., using control circuitry 304) halo 562 smaller than bezel 564. In some embodiments, lamp 510 may be perceivable by the user when halo 562 is generated for display by the media guidance application (e.g., using control circuitry 304). The media guidance application may select area 566 of the display screen to determine a color for halo 562.

FIG. 6 depicts a flow chart of illustrative steps for graphically accentuating a portion of viewing area 504. It should be noted that process 600, or any step thereof, could be performed on, or provided by, any of the devices shown in FIGS. 3-5. For example, process 600 may be executed by control circuitry 304 as instructed by a media guidance application implemented on user equipment 402, 404, 406, 502 and/or television 506 in order to graphically accentuate a portion of viewing area 504. In addition, one or more steps of process 600 may be incorporated into or combined with one or more steps of any other process or embodiment (e.g., process 700, 800 or 900).

At step 602, the media guidance application identifies a display screen of a first device that is perceivable to a user within a viewing area of a second device. For example, the media guidance application may use control circuitry 304 to identify display screen 508 of television 506 within a viewing area 504 of second user equipment device 502.

At step 604, the media guidance application determines a perimeter of the display screen within the viewing area. For example, the media guidance application may use control circuitry 304 to determine perimeter 532 of display screen 508 within viewing area 504 of second user equipment device 502. The media guidance application may use control circuitry 304 to identify vertices of display screen 508 and may interpolate points between the vertices to determine perimeter 532.

At step 606, the media guidance application graphically accentuates, as perceived by the user, a portion of the viewing area within the perimeter relative to a portion of the viewing area outside of the perimeter by modifying a visual characteristic of the area outside of the perimeter. For example, the media guidance application may use control circuitry 304 to adjust a voltage across a portion of an electrochromic layer of viewing area 504 such that the change in voltage adjusts the light transmittance of the layer, and subsequently that of viewing area 504. The media guidance application may adjust the voltage of a portion of an electrochromic layer corresponding to portion 534 of viewing area 504 outside of perimeter 532.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
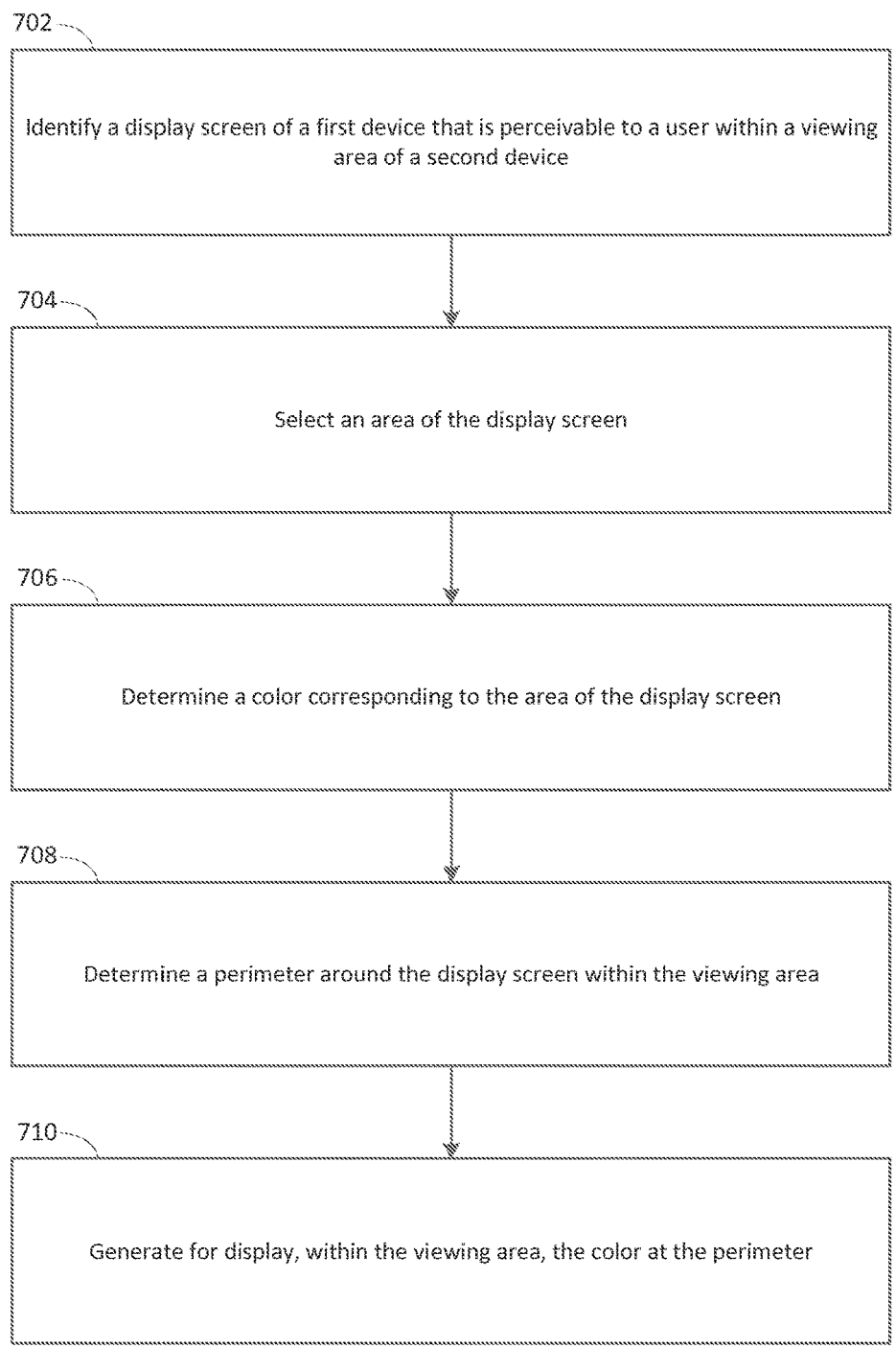
FIG. 7 is a flow chart of illustrative steps for generating a halo effect around a display screen in accordance with some embodiments of the disclosure.

FIG. 7 depicts a flow chart of illustrative steps for generating halo 562 within viewing area 504. It should be noted that process 700, or any step thereof, could be performed on, or provided by, any of the devices shown in FIGS. 3-5. For example, process 700 may be executed by control circuitry 304 as instructed by a media guidance application implemented on user equipment 402, 404, 406, 502 and/or television 506 in order to graphically accentuate a portion of viewing area 504. In addition, one or more steps of process 700 may be incorporated into or combined with one or more steps of any other process or embodiment (e.g., process 600, 800 or 900).

At step 702, the media guidance application identifies a display screen of a first device that is perceivable to a user within a viewing area of a second device. For example, the media guidance application may use control circuitry 304 to identify display screen 508 of television 506 within a viewing area 504 of second user equipment device 502.

At step 704, the media guidance application selects an area of the display screen. For example, the media guidance application may use control circuitry 304 to select an area 566 of display screen 508. The media guidance application may select area 566 of display screen 508 so that a color can be selected from area 566 to be generated for display in halo 562.

At step 706, the media guidance application determines a color corresponding to the area of the display screen. For example, the media guidance application may use control circuitry 304 to determine a color corresponding to display screen 508 within area 566. The media guidance application may use communication network 414 to communicate with television 506 to determine the color in the area. In some embodiments, the media guidance application may use control circuitry 304 to access media guidance data source 418 to determine the colors of area 566 of display screen 508. The media guidance application may retrieve information about the colors of a frame from media guidance data source 418 via communications network 414. Alternatively, the media guidance application may use control circuitry 304 and a camera corresponding to second user equipment device 502 to calculate a color.

At step 708, the media guidance application determines a perimeter around the display screen within the viewing area. For example, the media guidance application may use control circuitry 304 to determine perimeter 532 of display screen 508 within viewing area 504 of second user equipment device 502. The media guidance application may use control circuitry 304 to identify vertices of display screen 508 and may interpolate points between the vertices to determine perimeter 532.

At step 710, the media guidance application generates for display, within the viewing area, the color at the perimeter. The media guidance application may use control circuitry 304 to generate for display at viewing area 504 (e.g., display 312) colors at perimeter 532. The media guidance application may use control circuitry 304 to instruct a layer of viewing area 504, such as an LCD layer, to display colors at the perimeter.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

Figure 8:
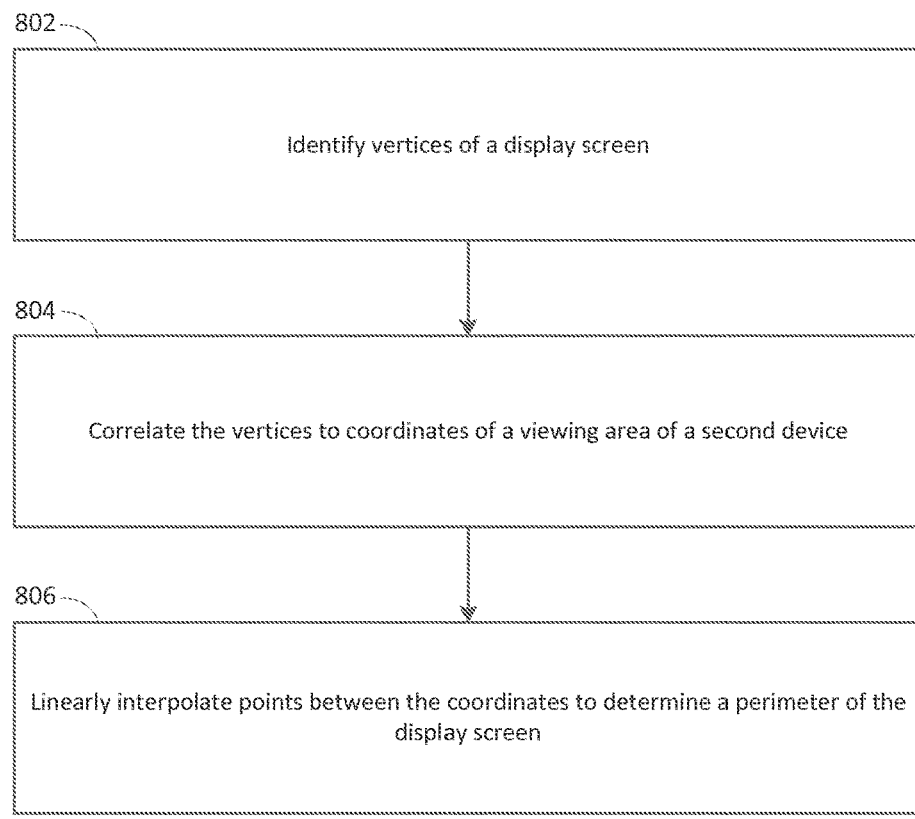
FIG. 8 is a flow chart of illustrative steps for calculating a perimeter around a display screen with respect to a viewing area of a user equipment device in accordance with some embodiments of the disclosure.

FIG. 8 depicts a flow chart of illustrative steps for determining perimeter 532 of a display screen 508. It should be noted that process 800, or any step thereof, could be performed on, or provided by, any of the devices shown in FIGS. 3-5. For example, process 800 may be executed by control circuitry 304 as instructed by a media guidance application implemented on user equipment 402, 404, 406, 502 and/or television 506 in order to graphically accentuate a portion of viewing area 504. In addition, one or more steps of process 800 may be incorporated into or combined with one or more steps of any other process or embodiment (e.g., process 600, 700 or 900).

At step 802, the media guidance application identifies vertices of a display screen. For example, the media guidance application may use control circuitry 304 to identify points of display screen 508 corresponding to vertices. The media guidance application may execute image processing instructions on control circuitry 304 to perform the identifying.

At step 804, the media guidance application correlates the vertices to coordinates of a viewing area of a second device. For example, the media guidance application may use control circuitry 304 to correlate the vertices to points, or coordinates in viewing area 504 of second user equipment device 502. For example, the media guidance application may use control circuitry 304 to access a database at media guidance data source 418 via communications network 414. The media guidance application may retrieve database pairs correlating the vertices to coordinates of the viewing area.

At step 806, the media guidance application linearly interpolates points between the coordinates to determine a perimeter of the display screen. For example, the media guidance application may use control circuitry 304 to calculate the points comprising a shortest distance between two vertices within viewing area 504 of second user equipment device 502. The points may be combined to form a perimeter of display screen 508 within viewing area 504.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 8.

Figure 9:
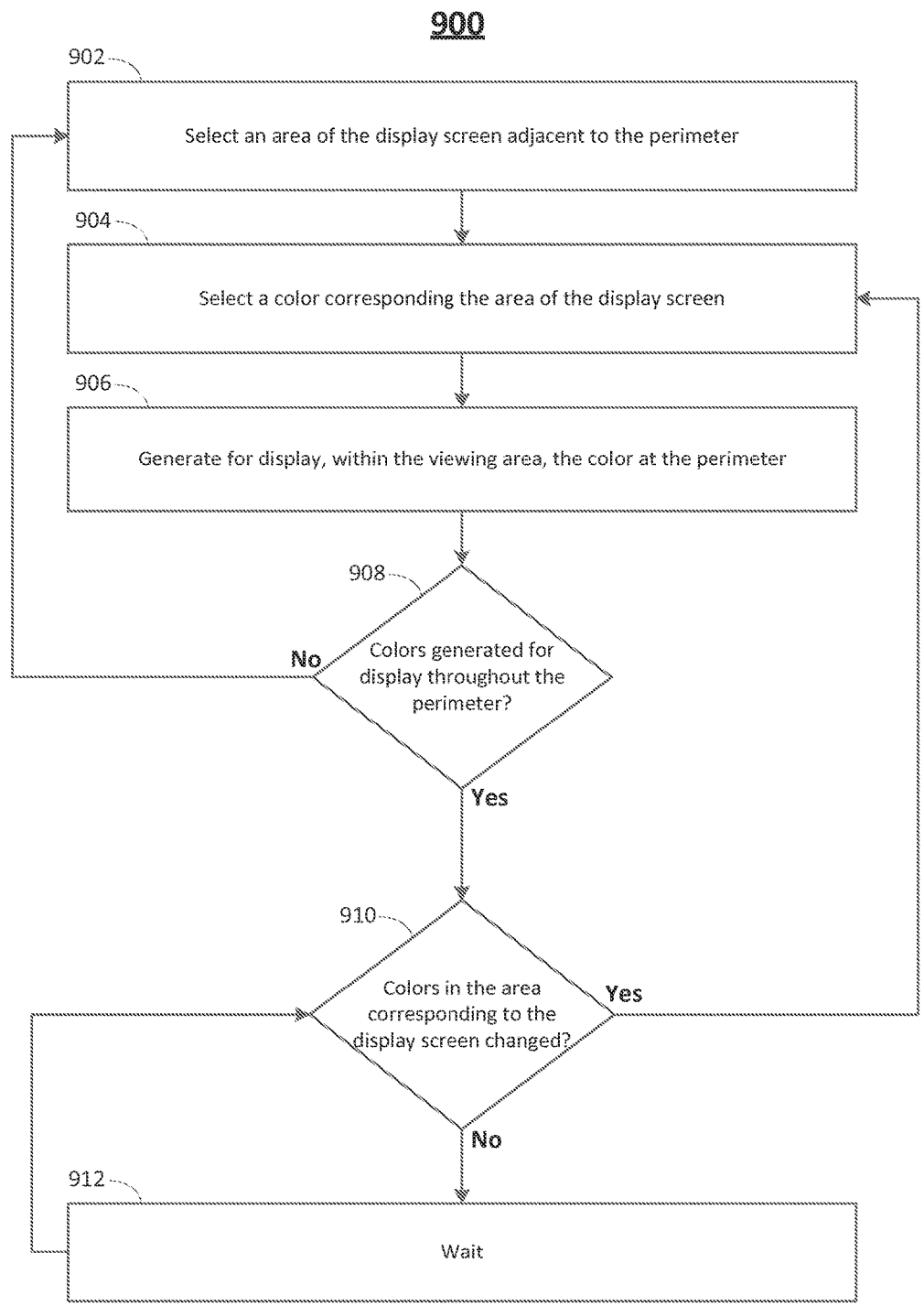
FIG. 9 is a flow chart of illustrative steps for selecting a color to be generated at a perimeter of a display screen within a viewing area of a user equipment device in accordance with some embodiments of the disclosure.

FIG. 9 depicts a flow chart of illustrative steps for selecting a color corresponding to display screen 508. It should be noted that process 900, or any step thereof, could be performed on, or provided by, any of the devices shown in FIGS. 3-5. For example, process 900 may be executed by control circuitry 304 as instructed by a media guidance application implemented on user equipment 402, 404, 406, 502 and/or television 506 in order to graphically accentuate a portion of viewing area 504. In addition, one or more steps of process 900 may be incorporated into or combined with one or more steps of any other process or embodiment (e.g., process 600, 700 or 800).

At step 902, the media guidance application selects an area of the display screen adjacent to the perimeter. For example, the media guidance application may use control circuitry 304 to select area 566 adjacent to perimeter 532 of display screen 508. The media guidance application may use control circuitry 304 to identify coordinates within perimeter 532 such that the distance between the identified coordinates and perimeter 532 is minimized.

At step 904, the media guidance application selects a color corresponding to the area of the display screen. For example, the media guidance application may use control circuitry 304 to determine a color corresponding to display screen 508 within area 566. The media guidance application may use communication network 414 to communicate with television 506 to determine the color in the area. In some embodiments, the media guidance application may use control circuitry 304 to access media guidance data source 418 to determine the colors of area 566 of display screen 508. Alternatively, the media guidance application may use control circuitry 304 and a camera of second user equipment device 502 to calculate a color.

At step 906, the media guidance application generates for display, within a viewing area, the color at the perimeter. For example, the media guidance application may use control circuitry 304 to generate for display at viewing area 504 (e.g., display 312) colors at perimeter 532. The media guidance application may use control circuitry 304 to instruct a projector of second user equipment device 502 to project, in viewing area 504, colors at the perimeter.

At step 908, the media guidance application determines if colors are generated for display throughout the perimeter. For example, the media guidance application may use control circuitry 304 to calculate a number of points in perimeter 532. If the media guidance application has generated for display a number of colors equal to the number of points, the media guidance application proceeds to 910; otherwise, the media guidance application proceeds to 902.

At step 910, the media guidance application determines if colors in the area corresponding to the display screen have changed. The media guidance application may use control circuitry 304 to observe colors of display screen 508 within area 566. If the media guidance application determines, using control circuitry 304, that the colors have changed within area 566, the media guidance application proceeds to 904. Otherwise, the media guidance application proceeds to 912.

At step 912, the media guidance application waits for the colors to change by making a determining in 910. For example, the media guidance application may use control circuitry 304 to start a timer. When the timer interrupts, the media guidance application may automatically proceed to 910 to determine if a color corresponding to the display screen has changed.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 9.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiments in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for enhancing viewing experiences of users, the method comprising:
  detecting a plurality of objects viewable through a viewing area of a second device, wherein the second device comprises a display layer configured to augment colors without permanently obstructing a field of view;
  processing the plurality of objects to determine that a first of the plurality of objects corresponds to a display screen of a first device;
  in response to determining that the first object corresponds to the display screen, determining a perimeter of the first object corresponding to the display screen, wherein determining the perimeter comprises:
    identifying vertices of the display screen;
    correlating the vertices to coordinates of the viewing area; and
    interpolating points between the coordinates to determine the perimeter of the display screen; and graphically accentuating the first object within the perimeter relative to an entire region of the viewing area that is outside the perimeter by modifying a visual characteristic of the entire region of the viewing area that is outside the perimeter such that the entire region of the viewing area that is outside the perimeter is darkened relative to the first object corresponding to the display screen.

2. The method of claim 1, wherein the plurality of objects are within the field of view as viewed through the second device.

3. The method of claim 2, wherein the second device comprises headwear configured to augment an environment.

4. The method of claim 1, wherein the viewing area comprises an electrochromic layer, and wherein the electrochromic layer is configured to adjust the light transmittance of the entire region of the viewing area that is outside the perimeter.

5. The method of claim 1, wherein the viewing area comprises a suspended particle layer, and wherein the second device is configured to adjust the voltage across the suspended particle layer to adjust the light transmittance of the entire region of the viewing area that is outside of the perimeter to graphically accentuate the first object within the perimeter.

6. The method of claim 1, wherein darkening the entire region of the viewing area outside the perimeter comprises:
   calculating, at the second device, an ambient lighting value of the viewing area;
   comparing the ambient lighting value with a look up table of light transmittance values and ambient lighting value pairs to identify a light transmittance value matching the ambient lighting value; and
   based on the identified light transmittance value, adjusting the light transmittance of the entire region of the viewing area outside of the perimeter to graphically accentuate the first object within the perimeter.

7. The method of claim 1, wherein graphically accentuating the first object within the perimeter further comprises modifying a visual characteristic of the first object within the perimeter.

8. The method of claim 7, further comprising:
   identifying a color in the first object within the perimeter;
   modifying a parameter of the color to generate a modified color; and
   generating for display the modified color within the perimeter.

9. The method of claim 1, wherein interpolating points between the coordinates to determine the perimeter of the display screen comprises linearly interpolating points between the coordinates to determine the perimeter of the display screen.

10. A system for enhancing viewing experiences of users, the system comprising control circuitry configured to:
    detect a plurality of objects viewable through a viewing area of a second device, wherein the second device comprises a display layer configured to augment colors without permanently obstructing a field of view;
    process the plurality of objects to determine that a first of the plurality of objects corresponds to a display screen of a first device;
    in response to determining that the first object corresponds to a display screen, determine a perimeter of the first object corresponding to the display screen, wherein when determining the perimeter, the control circuitry is configured to:
    identify vertices of the display screen;
    correlate the vertices to coordinates of the viewing area; and
    interpolate points between the coordinates to determine the perimeter of the display screen; and
    graphically accentuate the first object within the perimeter relative to an entire region of the viewing area that is outside the perimeter by modifying a visual characteristic of the entire region of the viewing area that is outside the perimeter such that the entire region of the viewing area that is outside the perimeter is darkened relative to the first object.

11. The system of claim 10, wherein the plurality of objects are within the field of view as viewed through the second device.

12. The system of claim 11, wherein the second device comprises headwear configured to augment an environment.

13. The system of claim 10, wherein the viewing area comprises an electrochromic layer, and wherein the electrochromic layer is configured to adjust the light transmittance of the entire region of the viewing area that is outside the perimeter.

14. The system of claim 10, wherein the viewing area comprises a suspended particle layer, and wherein control circuitry of the second device is configured to adjust the voltage across the suspended particle layer to adjust the light transmittance of the entire region of the viewing area that is outside of the perimeter to graphically accentuate the first object within the perimeter.

15. The system of claim 10, wherein the control circuitry configured to darken the entire region of the viewing area outside the perimeter is further configured to:
    calculate, at the second device, an ambient lighting value of the viewing area;
    compare the ambient lighting value with a look up table of light transmittance values and ambient lighting value pairs to identify a light transmittance value matching the ambient lighting value; and
    based on the identified light transmittance value, adjust the light transmittance of the entire region of the viewing area that is outside of the perimeter to graphically accentuate the first object within the perimeter.

16. The system of claim 10, wherein the control circuitry configured to graphically accentuate the first object within the perimeter further comprises modifying a visual characteristic of the first object within the perimeter.

17. The system of claim 16, wherein the control circuitry is further configured to:
    identify a color of the first object within the perimeter;
    modify a parameter of the color to generate a modified color; and
    generate for display the modified color within the perimeter.

18. The system of claim 10, wherein when interpolating points between the coordinates to determine the perimeter of the display screen, the control circuitry is further configured to linearly interpolate points between the coordinates to determine the perimeter of the display screen.

* * * * *